United States Patent [19]
Banno et al.

[11] Patent Number: 5,680,581
[45] Date of Patent: Oct. 21, 1997

[54] MICROCOMPUTER HAVING A READ PROTECTION CIRCUIT TO SECURE THE CONTENTS OF AN INTERNAL MEMORY

[75] Inventors: Moriyasu Banno, Yokohama; Tatsuo Inoue, Kawasaki, both of Japan

[73] Assignee: Kabushiki Kaisha Toshiba, Kawasaki, Japan

[21] Appl. No.: 364,989

[22] Filed: Dec. 28, 1994

[30] Foreign Application Priority Data

Dec. 28, 1993 [JP] Japan .................................. 5-334997

[51] Int. Cl.$^6$ ...................................................... G06F 12/14
[52] U.S. Cl. ............................................ 395/490; 395/186
[58] Field of Search .................................. 395/490, 288, 395/479, 186; 380/3, 4

[56] References Cited

U.S. PATENT DOCUMENTS

| | | | |
|---|---|---|---|
| 4,521,853 | 6/1985 | Guttag | 395/490 |
| 4,523,271 | 6/1985 | Levien | 395/186 |
| 4,875,156 | 10/1989 | Tanagawa et al. | 395/375 |
| 5,014,191 | 5/1991 | Padgaonkar et al. | 395/490 |
| 5,067,077 | 11/1991 | Wakimoto et al. | 395/490 |
| 5,155,829 | 10/1992 | Koo | 395/490 |
| 5,251,304 | 10/1993 | Sibigtroth | 395/375 |
| 5,347,636 | 9/1994 | Ooi et al. | 395/413 |
| 5,355,466 | 10/1994 | Iwamoto | 395/288 |
| 5,557,743 | 9/1996 | Pombo et al. | 395/186 |

OTHER PUBLICATIONS

MCS-51 Family of Single Chip Microcomputers User's Manual; Intel Corporation; Jul. 1981; pp. 2-15 to 2-17, 3-1, 4-43, 4-69.

Primary Examiner—Eddie P. Chan
Assistant Examiner—Kevin L. Ellis
Attorney, Agent, or Firm—Oblon, Spivak, McClelland, Maier & Neustadt, P.C.

[57] ABSTRACT

A microcomputer has an internal program memory for storing a program and/or data, an external program memory for storing a program and/or data, a CPU for outputting a first address, for fetching an instruction stored at a location indicated by the first address from the internal program memory or the external program memory and executing the fetched instruction, and for, when the instruction instructs to read out a program or data, outputting a second address, and an internal program memory read protection circuit for receiving the first address output from the CPU and checking if the first address is present in the address space of the internal program memory, for receiving, from the CPU, the second address indicating the storage location of a program or data to be read out in accordance with the instruction and checking if the second address is present in the address space of the internal program memory. When the first address is not present in the address space of the internal program memory and the second address is present in the address space of the internal program memory, the internal program memory read protection circuit outputs a read inhibition signal to the internal program memory. The internal program memory does not execute a read access upon reception of the read inhibition signal.

12 Claims, 8 Drawing Sheets

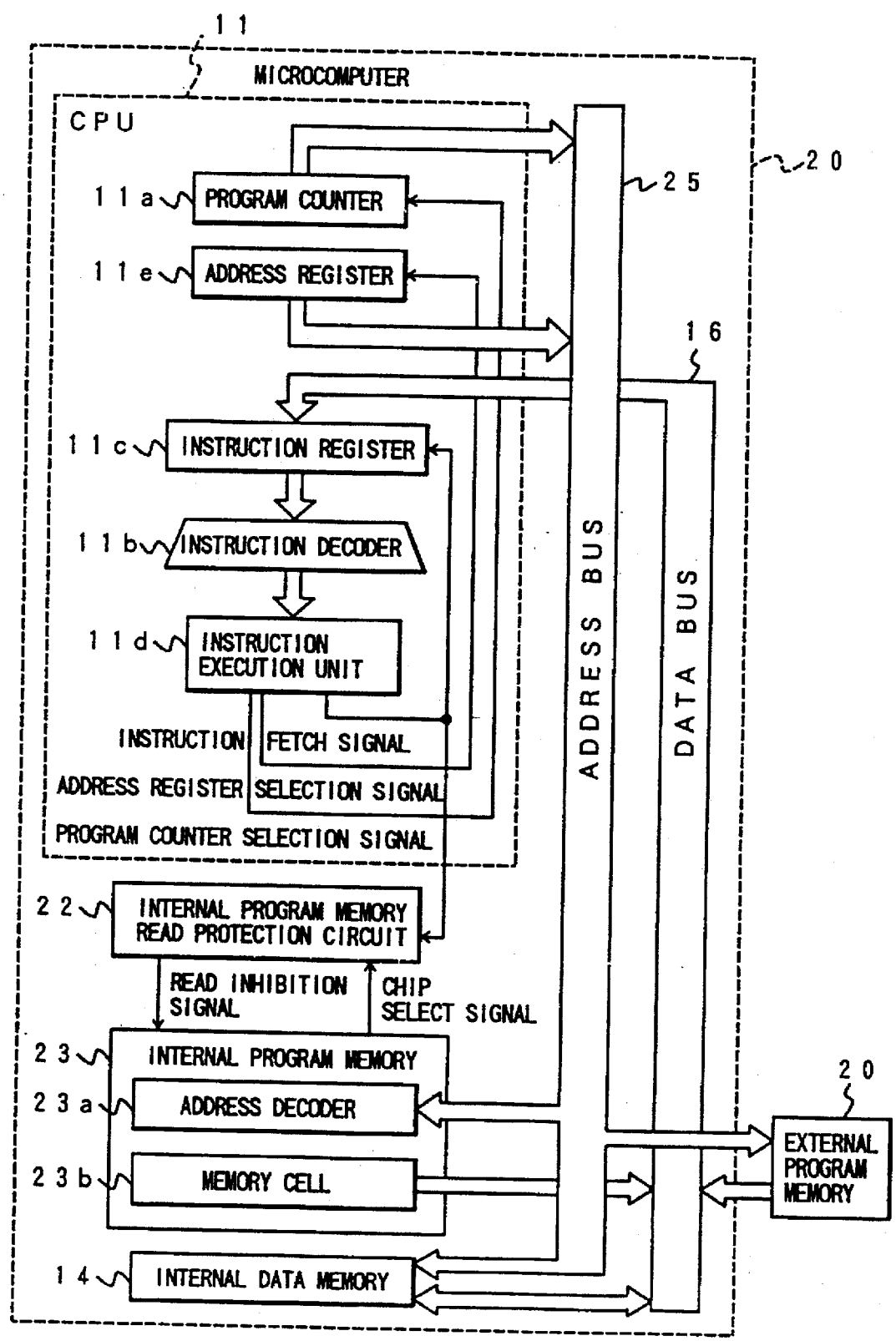
F I G. 4

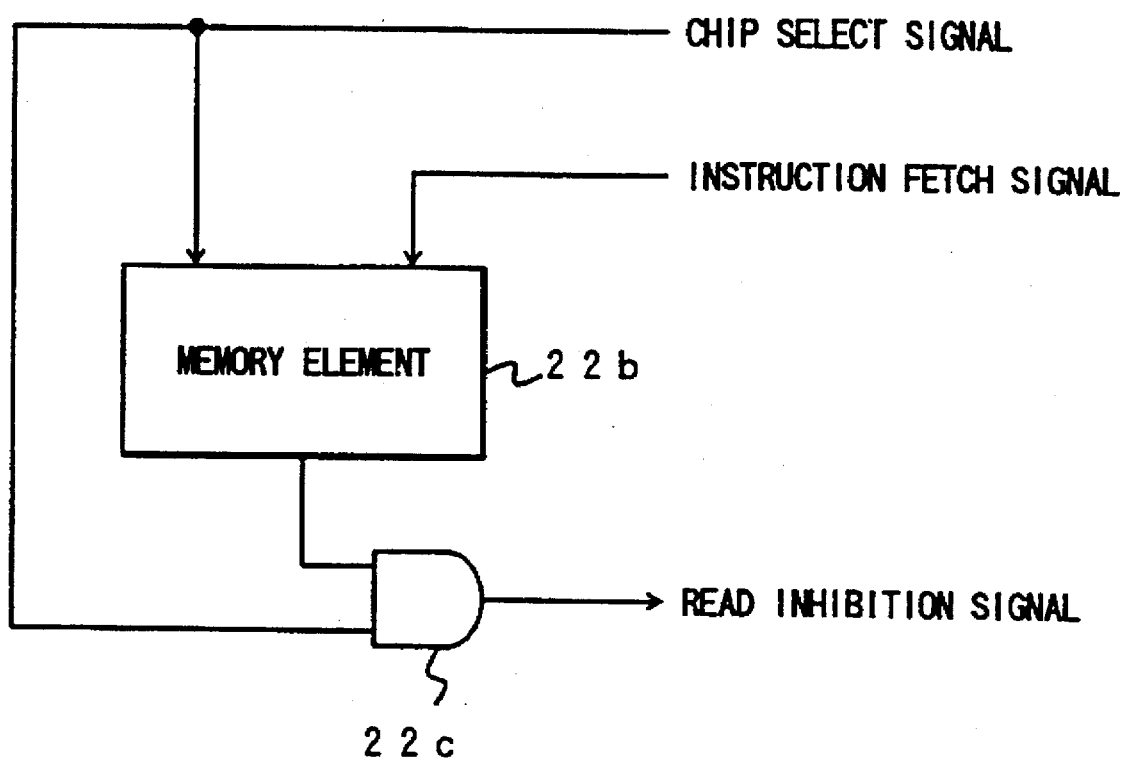
F I G. 5

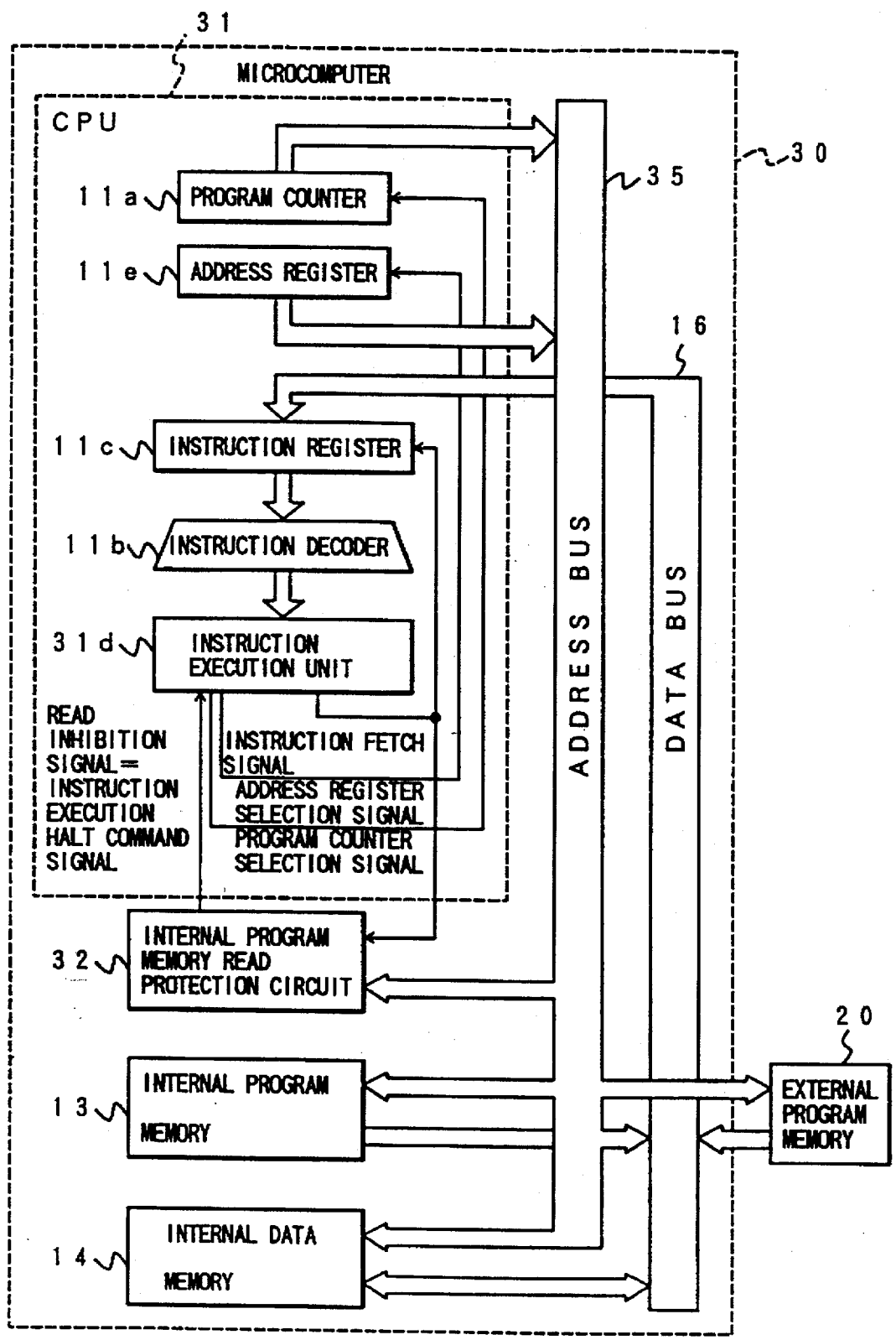
F I G. 6

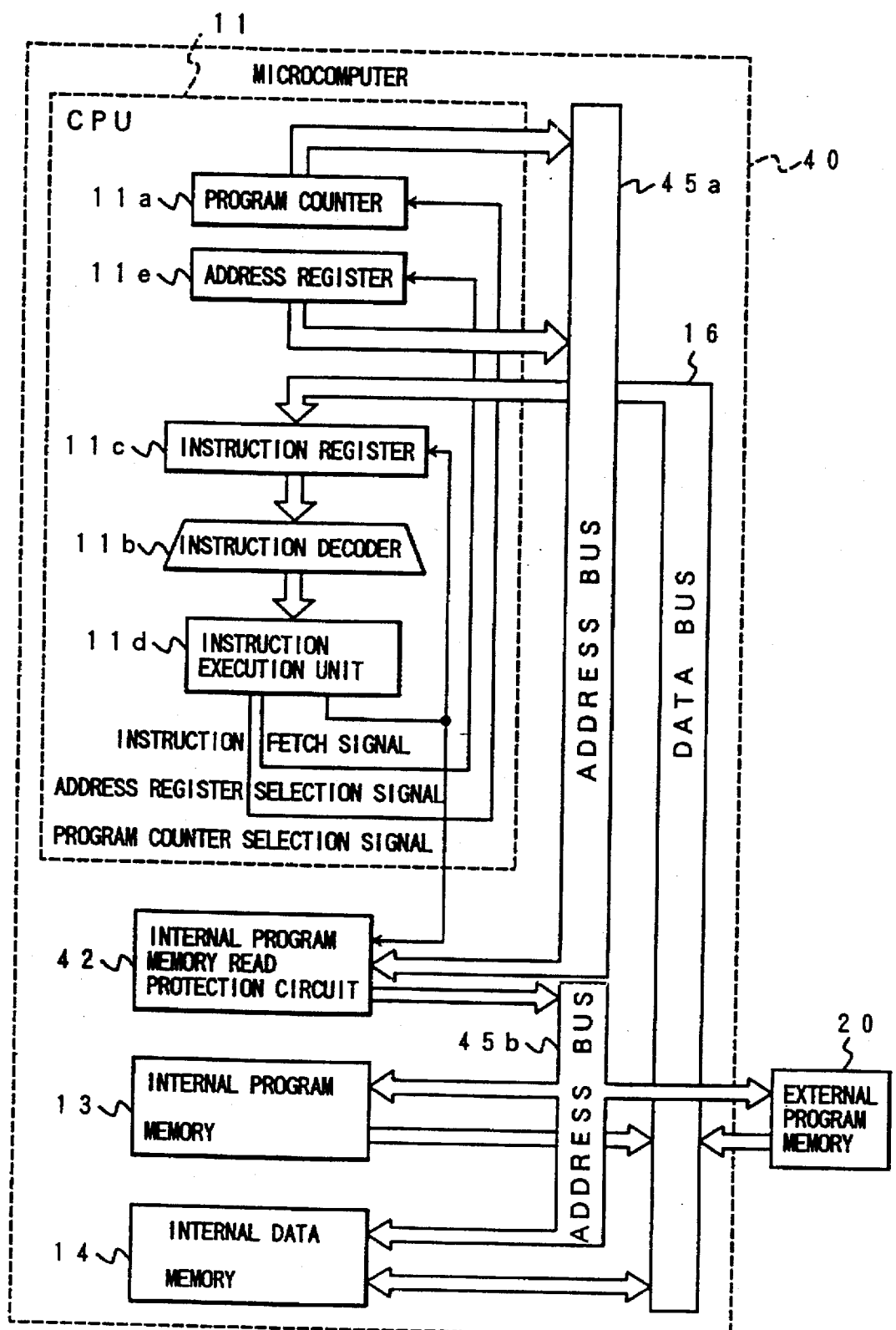
F I G. 7

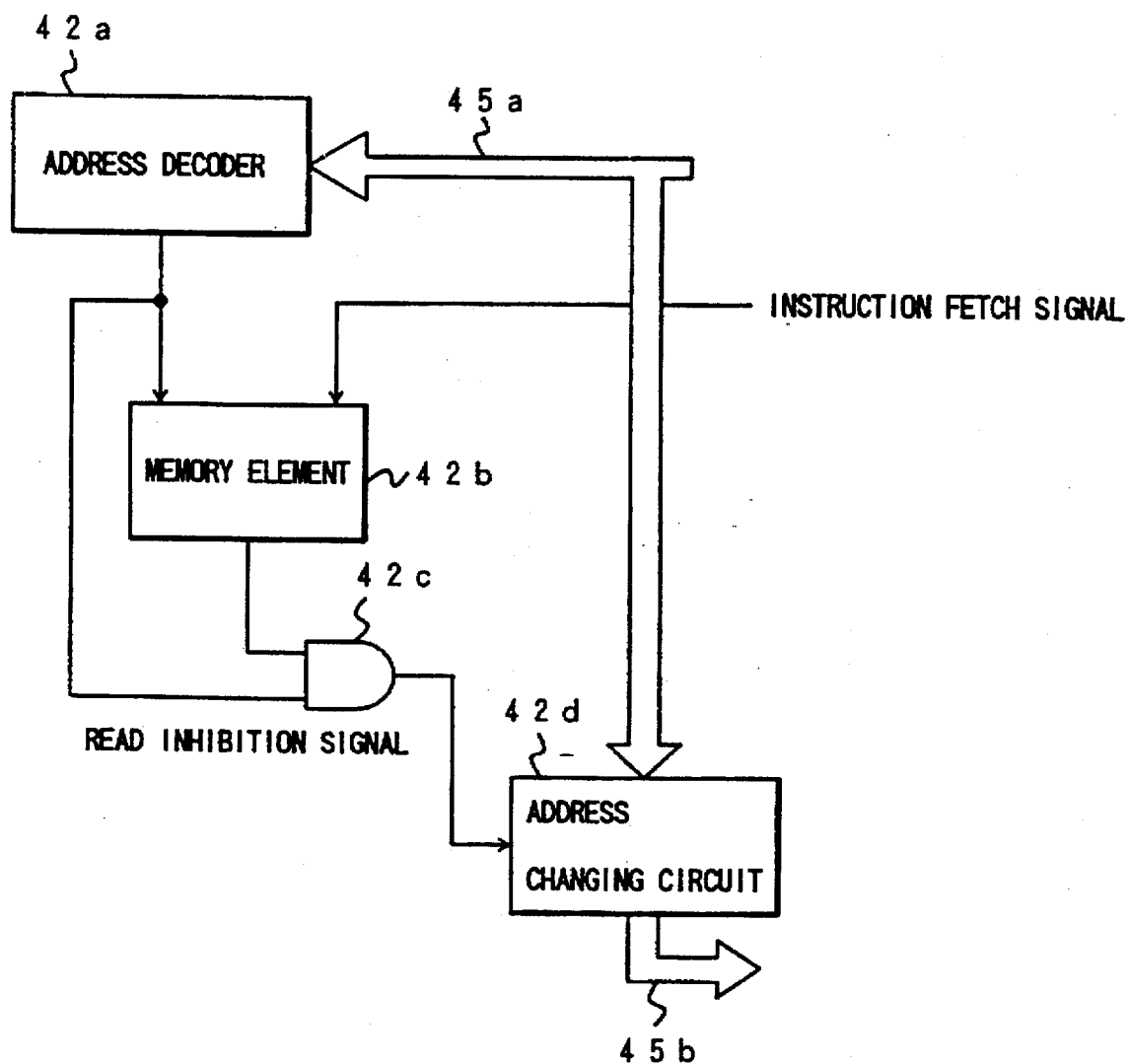
F I G. 8

MICROCOMPUTER HAVING A READ PROTECTION CIRCUIT TO SECURE THE CONTENTS OF AN INTERNAL MEMORY

BACKGROUND OF THE INVENTION

The present invention relates to a microcomputer and, more particularly, to a microcomputer to which an external program memory can be connected for expansion.

In recent years, microcomputers to each of which an external program memory can be connected for expansion are popularly used. Most microcomputers include internal data memories in each of which a program can be written by a central processing unit (to be abbreviated as a CPU hereinafter), a direct memory access controller (to be abbreviated as a DMAC hereinafter), or the like.

In such a case, the contents of an internal program memory can be read out to an external circuit by a program written in the external program memory or the internal data memory.

However, disclosure of the contents of the internal program memory to a third party other than the developer of the program, the manufacturer of the microcomputer, and the like is often unwanted.

A conventional microcomputer cannot meet such a requirement, and the contents of the internal program memory cannot be prevented from being read out by a third party.

For example, in the case of an application apparatus of a microcomputer to which an external program memory is connected for expansion, a third party can easily rewrite the contents of the external program memory, and can read out the contents of the internal program memory without permission of the developer of the program and the manufacturer of the microcomputer by writing a program for externally outputting the contents of the internal program memory of the microcomputer in the external program memory, and operating the microcomputer.

The contents of the internal program memory can also be read out without consent of the developer of the program and the manufacturer of the microcomputer by writing a program for transferring the contents of the internal program memory the the internal data memory of the microcomputer and then outputting the contents of the internal data memory to an external circuit by a program written by a third party in the external program memory and operating the microcomputer in place of directly outputting the contents of the internal program memory to an external circuit.

SUMMARY OF THE INVENTION

It is, therefore, an object of the present invention to provide a microcomputer which can inhibit a third party from reading out the contents of an internal program memory of the microcomputer.

A microcomputer according to the present invention, which has an internal program memory and to which an external program memory can be connected for expansion, comprises detection means for detecting if an address read out from a register for holding the address used upon fetching an instruction from the program memory is present in an address space of the internal program memory, and means for, when it is detected that the address is not present in the address space of the internal program memory, inhibiting to read the contents of the internal program memory by the instruction.

The detection means detects if the address used upon fetching of an instruction from the program memory is present in the address space of the internal program memory, and when it is detected that the address is not present in the address space of the internal program memory, a read access of the contents of the internal program memory is inhibited. For this reason, the contents of the internal program memory can be prevented from being read out by a program (instructions) stored in a memory other than the internal program memory, e.g., the external program memory, an internal data memory, or the like.

In place of the means for inhibiting a read access of the contents of the internal program memory when it is detected that the address is not present in the address space of the internal program memory, the microcomputer may comprise address changing means for changing the read address to an address other than that in the address space of the internal program memory, or may comprise data changing means for changing read data (the contents of the internal program memory) to other data (for example, zero) or may comprise instruction execution halt means for halting execution of the instruction, or may comprise interrupt generation means for generating interrupts.

Alternatively, the microcomputer may comprise means for, when it is detected that the address is not present in specific address spaces of the internal program memory, inhibiting a read access of the contents of the internal program memory, or may comprise address changing means for changing the address to an address other than that in the address spaces of the internal program memory, or may comprise data changing means for changing read data (the contents of the internal program memory) to other data (for example, zero) or instruction execution halt means for halting execution of the instruction, or may comprise interrupt generation means for generating interrupt in such a case.

BRIEF DESCRIPTION OF THE DRAWINGS

FIG. 4 is a block diagram showing the arrangement of a microcomputer according to another embodiment of the present invention;

FIG. 5 is a block diagram showing an example of the arrangement of an internal program memory read protection circuit of the microcomputer shown in FIG. 4;

FIG. 6 is a block diagram showing the arrangement of a microcomputer according to still another embodiment of the present invention;

FIG. 7 is a block diagram showing the arrangement of a microcomputer according to still another embodiment of the present invention; and FIG. 8 is a block diagram showing an example of the arrangement of an internal program memory read protection circuit of the microcomputer shown in FIG. 7.

DESCRIPTION OF THE PREFERRED EMBODIMENTS

An embodiment of the present invention will be described below with reference to the accompanying drawings.

A microcomputer according to this embodiment has the following feature. That is, when the address of an instruction for reading out the contents of an internal program memory is not present in the address space (may be either the entire space or specific spaces) of the internal program memory, a read access of the contents of the internal program memory by this instruction is inhibited, the read address is changed, or the execution of the instruction is halted.

Figure 1:
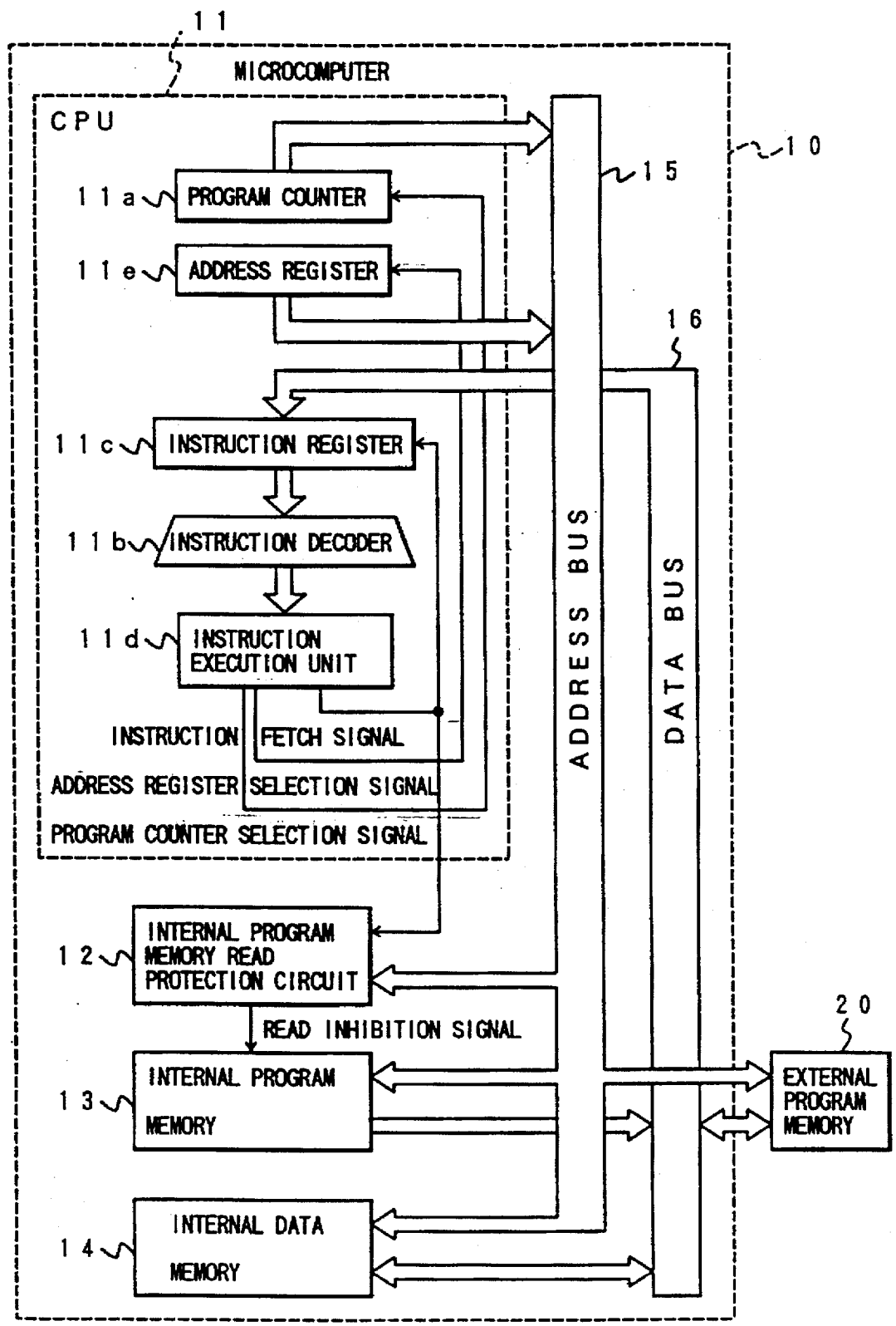
FIG. 1 is a block diagram showing the arrangement of a microcomputer according to an embodiment of the present invention.

FIG. 1 shows the arrangement of a microcomputer according to an embodiment of the present invention. A microcomputer 10 incorporates a CPU 11 having a program counter 11a, an instruction decoder 11b, an instruction register 11c, an instruction execution unit 11d, and an address register 11e; an internal program memory read protection circuit 12; an internal program memory 13; and a data memory 14, and also connects an external program memory 20.

The program counter 11a holds an address indicating the location where an instruction to be executed, and it outputs the address onto an address bus 15. The address register 11e outputs an address indicating the location where a program or data is stored onto the address bus 15 when an instruction is executed, and the program or data is read out in accordance with the instruction.

The instruction register 11c fetches, via a data bus 16, an instruction output from the location (the internal program memory 13 or the external program memory 20) indicated by the address output from the program counter 11a, and temporarily holds the fetched instruction. The instruction decoder 11b receives the instruction held by and output from the instruction register 11c, and decodes the fetched instruction. The instruction execution unit 11d receives the decoding result from the instruction decoder 11b, and executes the instruction. At this time, the instruction execution unit 11d outputs an instruction fetch signal to the internal program memory read protection circuit 12 and the instruction register 11c, as will be described later. Upon execution of an instruction, when the next required address based on the instruction is present in the program counter 11a, the instruction execution unit 11d outputs a program counter selection signal to the program counter 11a; when the next required address is present in the address register 11e, the unit 11d outputs an address register selection signal to the address register 11e.

When the internal program memory read protection circuit 12 receives an instruction fetch signal from the instruction execution unit 11d, it checks if the address indicating the location where the instruction at that time is stored is present in the address space of the internal program memory 13, and also checks if the address indicating the storage location of a program or data to be read out in accordance with the instruction is present in the address space of the internal program memory 13. Only when the address of the instruction is not present in the address space of the internal program memory 13 and the address of the program or data to be read out is present in the address space of the internal program memory 13, the protection circuit 12 outputs a read inhibition signal to the internal program memory 13.

The internal program memory 13 is an internal memory for storing a program or data. The internal data memory 14 is usually an internal memory for storing data. The external program memory 20 is an external memory for storing a program or data.

An address output from the program Counter 11a in the CPU 11 via the address bus 15 is supplied to the internal program memory read protection circuit 12, the internal program memory 13, the internal data memory 14, and the external program memory 20. A program or data stored in one of these memories indicated by the address is read out as an instruction, the readout instruction is held in the instruction register 11c via the data bus 16, and the instruction is decoded by the instruction decoder 11b.

When the instruction decoded by the instruction decoder 11b is executed by the instruction execution unit 11d, an instruction fetch signal from the instruction execution unit 11d is output to the internal program memory read protection circuit 12. The internal program memory read protection circuit 12 checks if the address of the instruction is present in the address space of the internal program memory 13, and also checks if the address of the program or data to be read out by the instruction is present in the address space of the internal program memory 13.

When the internal program memory read protection circuit 12 determines that the address of the instruction is not present in the address space of the internal program memory 13, and the address of the program or data to be read out by the instruction is present in the address space of the internal program memory 13, the internal program memory read protection circuit 12 outputs a read inhibition signal to the internal program memory 13, and a read access of the program or data is inhibited.

On the contrary, when the address of the instruction is present in the address space of the internal program memory 13, a read access based on this instruction is permitted independently of whether or not the address of the program or data to be read out by the instruction is present in the address space of the internal program memory 13. On the other hand, even when the address of the instruction is not present in the address space of the internal program memory 13, when the address of the program or data to be read out by the instruction is not present in the address space of the internal program memory 13, i.e., when the program or data to be read out is not stored in the internal program memory 13, a read access is permitted.

With this control, a read access of the program or data stored in the internal program memory 13 is permitted only when the instruction for instructing the read access is written in the internal program memory 13. As a result, even when a third party writes an instruction for reading out a program or data stored in the internal program memory 13 in a memory (e.g., the external program memory 20 or the internal data memory 14) other than the internal program memory 13, a read access based on such an instruction is inhibited.

Figure 2:
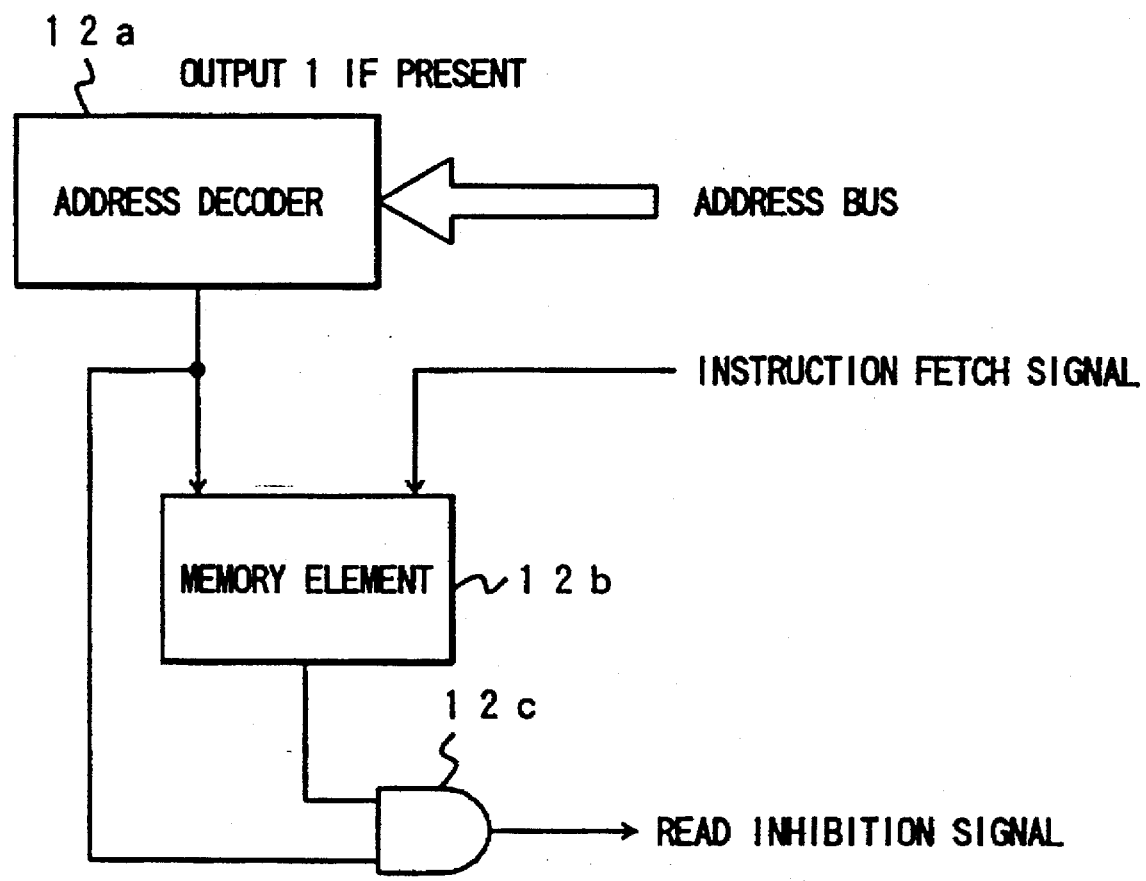
FIG. 2 is a block diagram showing an example of the arrangement of an internal program memory read protection circuit of the microcomputer shown in FIG. 1.

FIG. 2 shows an example of the detailed arrangement of the internal program memory read protection circuit 12. The protection circuit 12 comprises an address decoder 12a, a memory element 12b, and an AND gate 12c.

The address decoder 12a receives an address transferred from the address bus 15, detects if the received address is present in the address space of the internal program memory 13, and outputs the detection result.

Furthermore, an instruction fetch signal is output from the instruction execution unit 11d, and is supplied to the internal program memory read protection circuit 12. In synchronism with the supply timing of the instruction fetch signal to the memory element 12b, the detection result output from the address decoder 12a is stored in the memory element 12b.

When the address is present in the address space of the internal program memory 13, data of logic "1" is input to and stored in the memory element 12b. On the contrary, when the address is not present in the address space of the internal program memory 13, data of logic "0" is input to and stored in the memory element 12b.

The output from the memory element 12b and the output from the address decoder 12a are input to the AND gate 12c. The AND gate 12c outputs a read inhibition signal, and supplies it to the internal program memory 13.

When the address is present in the address space of the internal program memory 13, the memory element 12b stores data of logic "1", and at this time, the memory element 12b outputs inverted data of logic "0" to the AND gate 12c. When the address is not present in the address space of the internal program memory 13, the memory element 12b stores data of logic "0", and outputs data of logic "1" to the AND gate 12c.

Then, an address transferred from the address bus is input to the address decoder 12a. This address indicates a location where a program or data to be read out by the instruction is stored. The address decoder 12a checks if this address is present in the address space of the internal program memory 13. When the address is present, data of logic "1" is output from the address decoder 12a to the AND gate 12c; otherwise, data of logic "0" is output from the address decoder 12a to the AND gate 12c.

When the address of the instruction is not present in the address space of the internal program memory 13, and the address of the program or data to be read out by the instruction is present in the address space of the internal program memory 13, the memory element 12b outputs data of logic "1", the address decoder 12a outputs data of logic "1", and these data are output to the AND gate 12c. As a result, a read inhibition signal of logic "1" is output from the AND gate 12c to the internal program memory 13, thus inhibiting a read access by this instruction.

On the other hand, when the address of the instruction is present in the address space of the internal program memory 13, the memory element 12b outputs data of logic "0", and supplies it to the AND gate 12c. Therefore, independently of whether or not the address of the program or data to be read out is present in the address space of the internal program memory 13, the AND gate 12c outputs a read inhibition signal of logic "0", and supplies it to the internal program memory 13. In this case, a read access is permitted. Even when the address of the instruction is not present in the address space of the internal program memory 13, and the memory element 12b outputs data of logic "1", when the address of the program or data to be read out is not present in the address space of the internal program memory 13, the address decoder 12a outputs data of logic "0" to the AND gate 12c, and data of logic "0" is output from the AND gate 12c. Thus, a read access is permitted.

Figure 3:
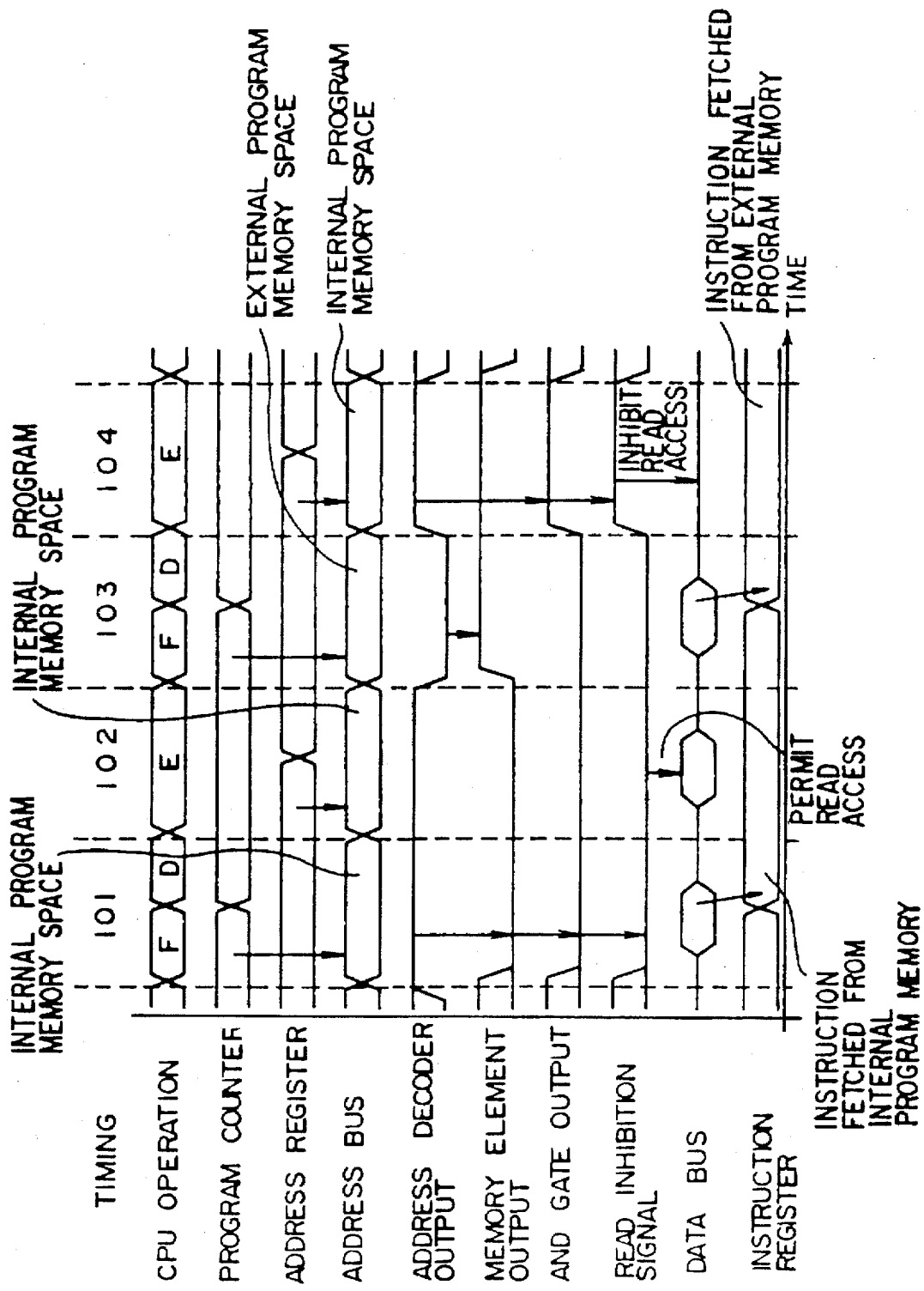
FIG. 3 is a timing chart showing the waveforms of the respective signals in the microcomputer shown in FIG. 1.

FIG. 3 is a timing chart of the signals in the embodiment shown in FIG. 2. Referring to FIG. 3, "F" in "CPU operation" represents an instruction fetch operation for reading out an instruction from a memory and holding the readout instruction by the instruction register 11c, "D" represents an instruction decode operation for decoding an instruction using the instruction decoder 11b, and "E" represents an instruction execution operation for executing an instruction using the instruction execution unit 11d.

A period 101 represents a period in which when the address of an instruction is present in the address space of the internal program memory 13, the instruction is fetched and decoded. A period 102 represents a period in which when the address of a program or data to be read out in accordance with the instruction is present in the address space of the internal program memory 13, a read access is permitted.

A period 103 represents a period in which when the address of an instruction is not present in the address space of the internal program memory 13, but is present in the address space of the external program memory 20, the instruction is fetched and decoded. A period 104 represents a period in which when the address of a program or data to be read out in accordance with the instruction is present in the address space of the internal program memory 13, a read access is inhibited. The periods 101 to 104 will be described in detail below.

During the period 101, the CPU 11 outputs an address from the program counter 11a to the address bus 15 to fetch the next instruction to be executed. This address is present in the address space of the internal program memory 13. Thus, data of logic "1" is output from the address decoder 12a in the internal program memory read protection circuit 12, and is stored in the memory element 12b. Thereafter, the memory element 12b outputs data of logic "0". Therefore, the output from the AND gate 12c goes to logic "0", and a read access of the contents of the internal program memory 13 is permitted. An instruction is read out from the internal program memory designated by the address, and is held in the instruction register 11c in the CPU 11. The instruction is then decoded by the instruction decoder 11b.

During the period 102, the instruction decoded by the instruction decoder 11b is executed by the instruction execution unit 11d. Thus, the contents of the internal program memory 13 are read out onto the data bus 16 in accordance with the address transferred from, e.g., the address register 11e via the address bus 15. A read access of the contents of the internal program memory 13 is permitted since the read inhibition signal is at logic "0".

During the periods 103 and 104, as described above, an instruction stored in a memory other than the internal program memory 13, e.g., the external program memory 20 is used in an attempt to read out the contents of the internal program memory 13.

During the period 103, the CPU 11 outputs an address from the program counter 11a to the address bus 15 to fetch the next instruction to be executed. This address is not present in the address space of the internal program memory 13. Therefore, data of logic "0" is output from the address decoder 12a in the internal program memory read protection circuit 12, and is stored in the memory element 12b. Then, the memory element 12b outputs data of logic "1" to the AND gate 12c.

An instruction is read out from the external program memory designated by the address, and is held in the instruction register 11c in the CPU 11. Then, the held instruction is decoded by the instruction decoder 11b.

During the period 104, the instruction decoded by the instruction decoder 11b is executed by the instruction execution unit 11d. In order to read out the contents of the internal program memory 13 in accordance with this instruction, the CPU 11 outputs the address present in the address space of the internal program memory 13 from, e.g., the address register 11e onto the address bus 15. The address of a program or data to be read out is supplied to the address decoder 12a in the internal program memory read protection circuit 12, and the address decoder 12a outputs data of logic "1" to the AND gate 12c. Thus, the output from the AND gate 12c goes to logic "1", and a read access of the contents of the internal program memory 13 is inhibited. As a result, the contents of the internal program memory 13 are not read out.

As described above, according to this embodiment, the contents of the internal program memory cannot be read out using an instruction stored in a memory outside the address space of the internal program memory, and can be prevented from being disclosed to a third party.

The above-mentioned embodiment is an example, and does not limit the present invention. For example, the arrangement of the internal program memory read protection circuit 12 shown in FIG. 2 is an example, and the present invention is not limited to this. This protection circuit 12 need only inhibit a read access of the contents of the internal program memory when the address from which an instruction is to be fetched is present outside the address space of the internal program memory 13. For example, like in a microcomputer shown in FIG. 4, an internal program memory 23 may incorporate an address decoder 23a in place of incorporating the address decoder in an internal program memory read protection circuit 22. In this case, the address decoder 23a in the internal program memory 23 decodes the address space of a memory cell 23b, and generates and outputs a chip (memory cell) select signal.

FIG. 5 shows an example of the arrangement of the internal program memory read protection circuit 22 in this case. The internal program memory read protection circuit 22 has a memory element 22b and an AND gate 22c. The memory element 22b receives an instruction fetch signal and a chip select signal. The instruction fetch signal is output from the instruction execution unit 11d, and the chip select signal is output from the address decoder 23a in the internal program memory 23.

When the address is present in the address space of the internal program memory 23, the address decoder 23a outputs a chip select signal of logic "1"; when the address is present outside the address space of the internal program memory 23, the decoder 23a outputs a chip select signal of logic "0". When an instruction fetch signal is input, the memory element 22b stores the chip select signal at that time in synchronism with the reception timing of the instruction fetch signal. When a chip select signal of logic "1" is input to the memory element 22b, a signal of logic "0" is output and is supplied to the AND gate 22c; when a chip select signal of logic "0" is input, a signal of logic "1" is output and is supplied to the AND gate 22c.

Then, in accordance with an instruction read out from the memory space designated by the address, an address indicating a location where a program or data to be read out is stored is input to the address decoder 23a.

When the address of the program or data to be read out is present in the address space of the internal program memory 23, a chip select signal of logic "1" is output from the address decoder 23a, and is input to the AND gate 22c. In this case, when the address of the read instruction is present in the address space of the internal program memory 23, since data of logic "0" is output from the memory element 22b to the AND gate 22c, the read inhibition signal goes to logic "0", and a read access is permitted. On the contrary, when the address of the read instruction is not present in the address space of the internal program memory 23, since data of logic "1" is output from the memory element 22b to the AND gate 22c, the read inhibition signal goes to logic "1", and a read access is inhibited.

When the address of the program or data to be read out is present outside the address space of the internal program memory 23, a chip select signal of logic "0" is output from the address decoder 23a, and is input to the AND gate 22c. In this case, since the AND gate 22c outputs a read inhibition signal of logic "0" independently of whether or not the address of the read instruction is present in the address space of the internal program memory 23, a read access is permitted.

FIG. 6 shows the arrangement of a microcomputer 30 according to another embodiment of the present invention.

The microcomputer 30 incorporates a CPU 31 having a program counter 11a, an instruction decoder 11b, an instruction register 11c, an instruction execution unit 31d, and an address register 11e; an internal program memory read protection circuit 32; a program memory 13; and a data memory 14, and also connects an external program memory 20.

An address output from the program counter 11a or the address register 11e via an address bus 35 is supplied from the CPU 31 to the internal program memory read protection circuit 32, the internal program memory 13, the internal data memory 14, and the external program memory 20.

An instruction is read out from a memory designated by the address output from the program counter 11a, and is held in the instruction register 11c via a data bus 16. The instruction held in the instruction register 11c is decoded by the instruction decoder 11b, and is executed by the instruction execution unit 31d.

While this instruction is being executed, the internal program memory read protection circuit 32 checks if the address supplied from the address register 11e via the address bus 35 is present in the address space of the internal program memory 13. Only when the address indicating a location where the instruction is stored is not present in the address space of the internal program memory 13, and the address indicating a location where a program or data to be read out in accordance with the instruction is stored is present in the address space of the internal program memory 13, a read inhibition signal of logic "1" is output from the internal program memory read protection circuit 32, and is supplied to the instruction execution unit 31d. The read inhibition signal of logic "1" corresponds to an instruction execution halt command signal in this embodiment, and when this signal is supplied to the instruction execution unit 31d, execution of an instruction is halted. With this control, a read access of the contents of the internal program memory 13 on the basis of the instruction is inhibited. On the other hand, when the address of the instruction is present in the address space of the internal program memory 13, or when the address of the instruction is not present in the address space of the internal program memory 13 and the address of a program or data to be read out in accordance with the instruction is not present in the address space of the internal program memory 13, a read inhibition signal of logic "0" is supplied to the instruction execution unit 31d. In this case, the instruction execution unit 31d continues execution of the instruction. As a result, a read access according to the instruction is executed.

In this embodiment, the read inhibition signal is supplied to the instruction execution unit 31d. However, the read inhibition signal may be supplied to the instruction decoder 11b. In this case, when a read inhibition signal of logic "1" is supplied to the instruction decoder 11b, the decode operation of the instruction is halted.

FIG. 7 shows the arrangement of a microcomputer according to still another embodiment of the present invention. A microcomputer 40 shown in FIG. 7 incorporates a CPU 11 having a program counter 11a, an instruction decoder 11b, an instruction register 11c, an instruction execution unit 11d, and an address register 11e; an internal program memory read protection circuit 42; a program memory 13; and a data memory 14, and also connects an external program memory 20.

An address output from the program counter 11a or the address register 11e via an address bus 45a is supplied from the CPU 11 to the internal program memory read protection circuit 42. FIG. 8 shows an example of the circuit arrangement of the internal program memory read protection circuit 42.

The internal program memory read protection circuit 42 comprises an address decoder 42a, a memory element 42b, an AND gate 42c, and an address changing circuit 42d.

As in the first and third embodiments, when an address supplied from the program counter 11a is present in the address space of the internal program memory 13, the memory element 42b outputs data of logic "0"; otherwise, the element 42b outputs data of logic "1".

Then, an address indicating the storage location of a program or data to be read out by the instruction is supplied to the address decoder 42a. When this address is present in the address space of the internal program memory 13, data of logic "1" is output to the AND gate 42c; otherwise, data of logic "0" is output to the AND gate 42c.

Only when the address of the instruction is not present, and the address of the program or data to be read out in accordance with the instruction is present in the address space of the internal program memory 13, the AND gate 42c outputs a read inhibition signal of logic "1".

When a read inhibition signal of logic "1" is supplied to the address changing circuit 42d, the circuit 42d outputs an address which is not present in the address space of the internal program memory 13 onto an address bus 45b (i.e., changes the address). On the contrary, when a read inhibition signal of logic "0" is supplied to the address changing circuit 42d, the circuit 42d outputs the same value as that on the address bus 45a onto the address bus 45b (i.e., does not change the address).

The address bus 45b is connected to the internal program memory 13, the internal data memory 14, and the external program memory 20. When the address is changed, since an address which is not present in the address space of the internal program memory 13 is output, the contents of the internal program memory 13 cannot be read out. With this control, a third party is inhibited from reading out the contents of the internal program memory 13 without permission of interested parties.

The embodiments described above are only exemplary and do not limit the scope of the present invention, and various modifications may be made within the scope of the invention. In each of the above embodiments, an object to be inhibited from being read out by a third party is the entire program or data stored in the internal program memory. However, an object to be inhibited from being read out may be stored in specific address spaces of the internal program memory. In this case, the contents of the internal program memory stored outside the specific address spaces can be read out by a third party. In such a case, only when the address indicating the storage location of an instruction is not present in the entire address spaces of the internal program memory, and a program or data to be read out in accordance with this instruction is not present in the specific address spaces of the internal program memory, a read access need be inhibited.

What is claimed is:

1. A microcomputer system comprising:
   an internal program memory for storing a program and/or data;
   an external program memory for storing a program and/or data;
   a CPU for outputting a first address, for fetching an instruction stored at a location indicated by the first address from one of said internal program memory and said external program memory and executing the fetched instruction, and for, when the instruction instructs to read out a program or data, outputting a second address; and
   an internal program memory read protection circuit for receiving the first address output from said CPU and checking if the first address is present in an address space of said internal program memory, for receiving, from said CPU, the second address indicating a storage location of a program or data to be read out in accordance with the instruction and checking if the second address is present in the address space of said internal program memory, and for, when the first address is not present in the address space of said internal program memory and the second address is present in the address space of said internal program memory, changing the second address to an address other than an address in the address space of said internal program memory.

2. A microcomputer according to claim 1, wherein said internal program memory read protection circuit checks if the first address is present in the address space of said internal program memory, in synchronism with a timing at which said CPU fetches the instruction.

3. A microcomputer according to claim 1, wherein said internal program memory read protection circuit comprises:
   an address decoder for receiving the first and second addresses, outputting a first discrimination result by checking if the first address is present in the address space of said internal program memory, and outputting a second discrimination result by checking if the second address is present in the address space of said internal program memory;
   a memory element for holding and outputting the first discrimination result output from said address decoder in synchronism with an instruction fetch signal output from said CPU;
   a logic operation element for performing a logic operation upon reception of an output from said memory element and the second discrimination result from said address decoder, and for, when the first address is not present in the address space of said internal program memory and the second address is present in the address space of said internal program memory, outputting a read inhibition signal; and
   an address changing circuit for, when said logic operation element outputs the read inhibition signal, changing the second address to an address other than an address in the address space of said internal address memory.

4. A microcomputer system comprising:
   an internal program memory for storing a program and/or data;
   an external program memory for storing a program and/or data;
   a CPU for outputting a first address, for fetching an instruction stored at a location indicated by the first address from one of said internal program memory and said external program memory and executing the fetched instruction, and for, when the instruction instructs to read out a program or data, outputting a second address; and
   an internal program memory read protection circuit for receiving the first address output from said CPU and checking if the first address is present in an address space of said internal program memory, for receiving, from said CPU, the second address indicating a storage location of a program or data to be read out in accordance with the instruction and checking if the second address is present in the address space of said internal program memory, and for, when the first address is not present in the address space of said internal program memory and the second address is present in the address space of said internal program memory, outputting an instruction execution halt command signal to said CPU, wherein said CPU halts execution of the instruction upon reception of the instruction execution halt command signal.

5. A microcomputer according to claim 4, wherein said internal program memory read protection circuit checks if the first address is present in the address space of said internal program memory, in synchronism with a timing at which said CPU fetches the instruction.

6. A microcomputer according to claim 4, wherein said internal program memory read protection circuit comprises:
   an address decoder for receiving the first and second addresses, outputting a first discrimination result by checking if the first address is present in the address space of said internal program memory, and outputting a second discrimination result by checking if the second address is present in the address space of said internal program memory;
   a memory element for holding and outputting the first discrimination result output from said address decoder in synchronism with an instruction fetch signal output from said CPU; and
   a logic operation element for performing a logic operation upon reception of an output from said memory element and the second discrimination result from said address decoder, and for, when the first address is not present in the address space of said internal program memory and the second address is present in the address space of said internal program memory, outputting the instruction execution halt command signal.

7. A microcomputer system comprising:
   an internal program memory for storing a program and/or data;
   an external program memory for storing a program and/or data;
   a CPU for outputting a first address, for fetching an instruction stored at a location indicated by the first address from one of said internal program memory and said external program memory and executing the fetched instruction, and for, when the instruction instructs to read out a program or data, outputting a second address; and
   an internal program memory read protection circuit for receiving the first address output from said CPU and checking if the first address is present in an entire address space of said internal program memory, for receiving, from said CPU, the second address indicating a storage location of a program or data to be read out in accordance with the instruction and checking if the second address is present in a specific address space of said internal program memory, and for, when the first address is not present in the entire address space of said internal program memory and the second address is present in the specific address space of said internal program memory, changing the second address to an address other than an address in the specific address space of said internal program memory.

8. A microcomputer according to claim 7, wherein said internal program memory read protection circuit checks if the first address is present in the entire address space of said internal program memory, in synchronism with a timing at which said CPU fetches the instruction.

9. A microcomputer according to claim 7, wherein said internal program memory read protection circuit comprises:
   an address decoder for receiving the first and second addresses, outputting a first discrimination result by checking if the first address is present in the entire address space of said internal program memory, and outputting a second discrimination result by checking if the second address is present in the specific address space of said internal program memory;
   a memory element for holding and outputting the first discrimination result output from said address decoder in synchronism with an instruction fetch signal output from said CPU;
   a logic operation element for performing a logic operation upon reception of an output from said memory element and the second discrimination result from said address decoder, and for, when the first address is not present in the entire address space of said internal program memory and the second address is present in the specific address space of said internal program memory, outputting a read inhibition signal; and
   an address changing circuit for, when said logic operation element outputs the read inhibition signal, changing the second address to an address other than an address in the specific address space of said internal address memory.

10. A microcomputer system comprising:
    an internal program memory for storing a program and/or data;
    an external program memory for storing a program and/or data;
    a CPU for outputting a first address, for fetching an instruction stored at a location indicated by the first address from one of said internal program memory and said external program memory and executing the fetched instruction, and for, when the instruction instructs to read out a program or data, outputting a second address; and
    an internal program memory read protection circuit for receiving the first address output from said CPU and checking if the first address is present in an entire address space of said internal program memory, for receiving, from said CPU, the second address indicating a storage location of a program or data to be read out in accordance with the instruction and checking if the second address is present in a specific address space of said internal program memory, and for, when the first address is not present in the entire address space of said internal program memory and the second address is present in the specific address space of said internal program memory, outputting an instruction execution halt command signal to said CPU,
    wherein said CPU halts execution of the instruction upon reception of the instruction execution halt command signal.

11. A microcomputer according to claim 10, wherein said internal program memory read protection circuit checks if the first address is present in the entire address space of said internal program memory, in synchronism with a timing at which said CPU fetches the instruction.

12. A microcomputer according to claim 10, wherein said internal program memory read protection circuit comprises:

an address decoder for receiving the first and second addresses, outputting a first discrimination result by checking if the first address is present in the entire address space of said internal program memory, and outputting a second discrimination result by checking if the second address is present in the specific address space of said internal program memory;

a memory element for holding and outputting the first discrimination result output from said address decoder in synchronism with an instruction fetch signal output from said CPU; and a logic operation element for performing a logic operation upon reception of an output from said memory element and the second discrimination result from said address decoder, and for, when the first address is not present in the entire address space of said internal program memory and the second address is present in the specific address space of said internal program memory, outputting the instruction execution halt command signal.

* * * * *